United States Patent
Cournoyer et al.

(10) Patent No.: US 11,715,854 B2
(45) Date of Patent: Aug. 1, 2023

(54) FASTENER-FREE BATTERY MODULES

(71) Applicant: Rivian IP Holdings, LLC, Plymouth, MI (US)

(72) Inventors: Travis Cournoyer, Redondo Beach, CA (US); Kyle Butterfield, Rancho Santa Margarita, CA (US); Nathaniel Wynn, Tustin, CA (US); Tyler Collins, Irvine, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 59 days.

(21) Appl. No.: 17/026,698

(22) Filed: Sep. 21, 2020

(65) Prior Publication Data
US 2022/0093901 A1   Mar. 24, 2022

(51) Int. Cl.
*H01M 10/6554* (2014.01)
*H01M 10/04* (2006.01)
*H01M 50/20* (2021.01)
*H01M 50/543* (2021.01)
*H01M 50/213* (2021.01)
*H01M 50/505* (2021.01)

(52) U.S. Cl.
CPC ....... *H01M 50/20* (2021.01); *H01M 10/0404* (2013.01); *H01M 10/6554* (2015.04); *H01M 50/543* (2021.01); *H01M 50/213* (2021.01); *H01M 50/505* (2021.01); *Y02E 60/10* (2013.01); *Y02P 70/50* (2015.11)

(58) Field of Classification Search
CPC ......... H01M 10/0404; H01M 10/6554; H01M 50/20; H01M 50/213; H01M 50/505; H01M 50/543; Y02E 60/10; Y02P 70/50
See application file for complete search history.

(56) References Cited

U.S. PATENT DOCUMENTS

| | | | | |
|---|---|---|---|---|
| 2012/0308873 A1* | 12/2012 | Sekino | ................ | H01M 50/209 429/156 |
| 2014/0045038 A1* | 2/2014 | Kimura | ............... | H01M 50/503 429/158 |
| 2019/0067656 A1* | 2/2019 | Zhang | ................... | H01M 50/20 |
| 2019/0198952 A1* | 6/2019 | Choi | ................... | H01M 50/291 |

FOREIGN PATENT DOCUMENTS

| | | |
|---|---|---|
| JP | 2013012464 A | 1/2013 |
| KR | 10-20130133855 A | 12/2013 |

* cited by examiner

*Primary Examiner* — Lingwen R Zeng (74) *Attorney, Agent, or Firm* — Haley Guiliano LLP (57) ABSTRACT

A battery system includes battery cells arranged and adhered to a carrier. One or more side walls are bonded with adhesive to the battery cells to provide support, and a current collector assembly is also adhered on one axial side of the battery cells. One or more dividers may be included to maintain electrically isolation between the parallel connected battery cell groups. The other axial side of the battery cells is adhered to a cooling plate. A similar structure is bonded with adhesive to the other side of the cooling plate to form a compact battery system. Shear walls, busbars, terminal busbars, and an isolation bracket with a mounted Electronic Control Unit are bonded with adhesive to the assembly to form the battery system. Each adhesive, or type of adhesive, may exhibit specified criteria and requirements such as strength, thermal conductivity, electronic conductivity, curing requirements, or a combination thereof.

20 Claims, 5 Drawing Sheets

FASTENER-FREE BATTERY MODULES

INTRODUCTION

The present disclosure is directed towards fastener-free battery modules, and more particularly towards battery modules assembled using adhesives to reduce or avoid the use of fasteners.

SUMMARY

In some embodiments, the present disclosure is directed to an apparatus that includes a plurality of battery cells, a carrier, a current collector, a side wall, and a cooling plate, assembled using adhesives. The plurality of battery cells are configured to provide electrical energy. The carrier is configured to maintain alignment of the plurality of battery cells. In some embodiments, the carrier includes a plurality of recesses configured to receive the plurality of battery cells on a first side of the carrier. The current collector is configured to be electrically coupled to the plurality of battery cells to form one or more buses. The side wall is configured to provide structural support to the apparatus. The cooling plate is configured to transfer heat from the plurality of battery cells as well as to provide structural support for the apparatus. A first type of adhesive bonds a first side of the carrier to the plurality of battery cells, a second type of adhesive bonds the side wall to the plurality of battery cells, a third type of adhesive bonds the current collector to a second side of the carrier, and a fourth type of adhesive bonds the plurality of battery cells to the cooling plate.

In some embodiments, the apparatus includes a plurality of dividers bonded to the carrier using the first type of adhesive and configured to maintain separation of the plurality of battery cells.

In some embodiments, the side wall includes at least one short side bonded to the plurality of battery cells using the second type of adhesive, and at least one long side bonded to the plurality of battery cells using the second type of adhesive and the third type of adhesive. For example, in some embodiments, the side wall includes one or more sections to provide support, isolation, or both to the battery cells.

In some embodiments, the first type of adhesive and the second type of adhesive are the same type of adhesive. In some embodiments, the second type of adhesive includes a fast-cure adhesive and a slow-cure adhesive, and the first type of adhesive and the slow-cure adhesive are the same adhesive.

In some embodiments, the present disclosure is directed to a method for assembling a battery system without fasteners. The method includes applying adhesives to respective components, and positioning the components. In some embodiments, the method includes applying a first type of adhesive to at least one of a carrier and a plurality of battery cells, and positioning the plurality of battery cells in respective recesses of the carrier. The first type of adhesive bonds the plurality of battery cells to the carrier. In some embodiments, the method includes applying a second type of adhesive to at least one of a lateral surface of a side wall and a side of the plurality of battery cells, and positioning the lateral surface of the side wall against the plurality of battery cells. The second type of adhesive bonds the side wall to the side of the plurality of battery cells. In some embodiments, the first type of adhesive and the second type of adhesive are the same type of adhesive. In some embodiments, the second type of adhesive includes a fast-cure adhesive and a slow-cure adhesive, and the first type of adhesive and the slow-cure adhesive are the same adhesive. In some embodiments, the method includes applying a third type of adhesive to at least one of a current collector assembly and the carrier, and positioning the current collector assembly against a second side of the carrier. The third type of adhesive bonds the current collector assembly to the carrier. In some embodiments, the method includes applying a fourth type of adhesive to at least one of the plurality of battery cells and a cooling plate, and positioning the plurality of battery cells against the cooling plate. The fourth type of adhesive bonds the plurality of battery cells to the cooling plate. In some embodiments, the method includes applying the first type of adhesive before applying the fourth type of adhesive.

In some embodiments, the method includes applying an adhesive to at least one of a shear wall and the side wall, and positioning the shear wall against the side wall. The fifth type of adhesive bonds the shear wall to the side wall to provide structural support to the plurality of battery cells.

In some embodiments, the method includes electrically coupling the current collector assembly to the plurality of battery cells to form one or more buses. For example, the current collector assembly may include current collectors configured to couple subsets of battery cells in parallel with each other and in series with other subsets.

In some embodiments, the method includes applying an adhesive to bond at least one terminal busbar to the side wall, and positioning at least one terminal busbar against the side wall. The at least one terminal busbar is configured to be electrically coupled to the plurality of battery cells. In some embodiments, the method includes applying the adhesive to bond the at least one terminal busbar to the side wall and to the cooling plate.

In some embodiments, the method includes applying an adhesive to bond a busbar to the side wall, and positioning the busbar against the side wall. The busbar is configured to be electrically coupled to the current collector assembly.

In some embodiments, the method includes positioning the plurality of battery cells in respective recesses of the carrier by arranging the plurality of battery cells laterally, and pressing the plurality of battery cells axially such that the bottom ends of the plurality of battery cells distal to the carrier substantially lie in a plane parallel to the carrier's top plane.

In some embodiments, the fourth type of adhesive is configured for transferring heat and shear stress between the plurality of battery cells and the cooling plate. In some embodiments, the first type of adhesive is configured for maintaining electrical isolation between the carrier and the plurality of battery cells. In some embodiments, the second adhesive is configured for transferring heat and shear stress between the plurality of battery cells and the side wall.

In some embodiments, the present disclosure is directed to an apparatus including battery submodules, a cooling plate, and shear walls, assembled using adhesives. The battery submodules include a first battery submodule having a first plurality of battery cells, and a second battery submodule having a second plurality of battery cells. The cooling plate is configured to transfer heat from the first plurality of battery cells and from the second plurality of battery cells. The shear wall is configured to provide structural support. The first battery submodule is affixed to the cooling plate using a first type of adhesive, the second battery submodule is affixed to the cooling plate using the first type of adhesive, and the shear wall is affixed to a first lateral surface of the first battery submodule and to a second lateral surface of the second battery submodule using a second type of adhesive.

In some embodiments, each battery submodule includes a carrier bonded to the plurality of battery cells and configured to maintain alignment of the plurality of battery cells, a current collector electrically coupled to the plurality of battery cells to form one or more buses, and a side wall bonded to the plurality of battery cells and configured to provide structural support to the apparatus.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Battery electric vehicles (BEVs) that are propelled exclusively by an electric drivetrain may have long charge times on the order of tens of minutes, and BEV manufacturers generally desire to increase the energy density of the BEV battery packs. Higher energy density battery packs may have a higher capacity-weight ratio and thus, achieve longer vehicle range. Many BEV manufacturers rely heavily on the use of fasteners, which take up valuable packaging space that could otherwise be filled with more battery cells. Accordingly, there is a need to remove parts such as fasteners from battery packs and instead fulfill the same requirements without taking up the packaging space they otherwise would require.

In some embodiments, the present disclosure is directed to a battery module design that relies almost exclusively on adhesives for structural support. For example, structural, load-bearing joints may be coupled exclusively using adhesives. In some embodiments, adhesives may be used for primary structural support, with fasteners included for redundancy. For example, in some embodiments, high voltage busbars of a battery module may include a redundant pushpin rivet nut due to the potential severity of a failure coupled with the potential likelihood of occurrence due to the high temperatures that the busbars can reach under some circumstances.

In some embodiments, the use of adhesive rather than fasteners to join parts allows filling of gaps between parts as well as providing a substrate through which mechanical, thermal, and/or electrical loads can transmit. For example, each adhesive joint within a battery module may serve multiple functions during operation including, for example: (1) transferring quasi-static loads between part A and part B; (2) transferring mechanical shock pulses between part A and part B; (3) transferring thermal energy between part A and part B; and (4) resisting the transfer of electrical energy between part A and part B.

To illustrate, even though some adhesives may be roughly three orders of magnitude (or more) denser than the air that they displace between parts, packaging savings may still outweigh the mass in the overall energy density calculation. This is because, as compared to fasteners, the additional clearances that would be required around bolt heads and threads may be saved for the inclusion of more battery cells.

In an illustrative example, adhesives that meet the bonding criteria in accordance with the present disclosure may be referred to as Structural, Thermal, Electrical Interface Materials (STEIM). For example, typical adhesives may only address a few one only one of these (e.g., adhesives having thermal management exclusively as a function). To illustrate, the distinction between adhesives that are STEIM vs. thermal interface materials (TIM) may be significant because the validation of functional performance of adhesives fulfilling structural, electrical, and thermal requirements drastically impacts the plan by which their performance in the design must be validated (e.g., the testing environment).

In some embodiments, the present disclosure is directed to a set of adhesives including a thermal adhesive used for structural bonding of battery cells to a cooling plate. For example, the thermal adhesive may exhibit a thermal conductivity range of 1 to 1.1 W/mK. In a further example, the thermal conductivity may be limited to about 1.1 W/mK or below to prevent a thermal filler loading that is too high, thus making the adhesive too brittle to reliably absorb shock and vibration loads during operation without cracking throughout the battery's entire useful life. In a further example, the lap shear strength of a thermal adhesive configured to bond nickel-plated steel may be about 14 MPa at the beginning of operation life and the adhesive may be configured to absorb less than 2% by weight water during a 2-hour long boiling water soak. In a further example, the glass transition temperature of a thermal adhesive may be selected to exceed the highest operational temperature of the battery cells by at least 30° C. to reduce fatigue from cycling through the glass transition temperature during operation.

Suitable verification of a set of adhesives may help ensure failures during operation are unlikely. For example, by specifying multiple requirements for each adhesive joint, the design verification plan (DVP) for each adhesive used in the design may be relatively more complex than has been seen before in the adhesives industry. Traditionally, the adhesives are selected for a single purpose (e.g., structural support or thermal interface management), but when these requirements are coupled with, for example, dielectric requirements, the validation matrix may triple (at least) for each adhesive. For example, illustrative characteristics to consider in a test matrix may include (1) bulk adhesive properties, (2) adhesive joint properties, and (3) degradation modes during operation.

Bulk adhesives properties are typically available for review for many off-the-shelf adhesives (e.g., and generally are relatively easy to determine). Material characteristics may include those related to mechanical strength during operation (e.g., lap shear, tensile strength, t-peel strength, modulus) and in simulation (e.g., Poisson ratio, loss modulus), dielectric strength (e.g., in terms of dielectric breakdown voltage or volume and surface resistance), thermal performance (specific heat capacity, thermal conductivity), or a combination thereof. In accordance with the present disclosure, the set of bulk characteristics may be determined at all temperatures within the operational temperature range of the battery pack. For example, the characteristics may be determined either directly or indirectly (e.g., determining a sufficient number of data points to generate a performance curve as a function of temperature). To illustrate, tests may need to be performed inside of a thermal chamber at temperatures ranging from as low as −40° C. to as high as 100° C.

If the validation scheme is partitioned into the relevant requirements for all of the individual joints of a battery module, the test matrix may become more complex. For example, a single adhesive may be used for a plurality of joints and may be bonded directly to a plurality different materials such as, for example, polycarbonate, epoxy powder coated aluminum, stainless steel, nickel-plated steel, nylon, aluminum, any other suitable material used in a battery module, or any combination thereof. During developmental testing, the strength of adhesive bonding to each of these substrates may be determined. For example, because shear strength may be the primary characteristic of adhesives, joints may be designed for loading in shear and the strength to these substrates should be measured with lap shear tests on suitable material testing equipment. In a further example, in the case that joints are expected to be loaded mostly in T-peel (e.g., a linear tensile loading at the end of a joint), a suitable T-peel test may be performed instead. In some circumstances, the bulk adhesive strength may exceed the bonding strength to a particular surface, and accordingly process parameters may be identified to increase strength of adhesion to the surface (e.g., before final part tools are generated). In some such circumstances, stress fractures may develop along the surface of the adhesive bond and may propagate quickly during operation due to degradation factors. To address the potential for insufficient bonding strength, in some embodiments, one or more process parameters are modified such as, for example, surface roughness (e.g., greater roughness generally results in greater adhesion), surface activation energy (e.g., higher energy generally results in greater adhesion), surface cleanliness (e.g., less particulates and oils on the surface generally result in greater adhesion), any other suitable parameters that may affect bonding, or any combination thereof. In an illustrative example, process steps or changes may include acid-etching a part tool for that surface, plasma-treating the surface before adhesive dispense, cleaning the bonding surface with alcohol before adhesive dispense, any other suitable process for preparing the surface, or any combination thereof.

Regarding degradation factors, the effect of loss of functional performance at each joint may be monitored by measuring, for example: (1) moisture absorption from humidity; (2) moisture absorption from ionized particulates (cell venting); (3) moisture absorption from incidental exposure to coolant (e.g., 50:50 water:ethylene glycol); (4) cycling through glass transition temperature (Tg); (5) mechanical fatigue from cycling; (6) stress crack propagation from thermal cycling; (7) creep at high temperature; any other suitable parameter or phenomenon; or any combination thereof. In some circumstances, degradation tests are performed before destructive mechanical tests such as lap shear. However, because of the electrical and thermal functions that these adhesives also may fulfill, degradation factors may be applied to test coupons that are subsequently run to re-validate electrical and thermal characteristics as well. Accordingly, degradation factors may be considered in totality with electrical and thermal operating conditions.

In some embodiments, the present disclosure is directed to apparatus that include adhesives for structural support, thermal management, and dielectric protection. Some benefits of using adhesives for battery modules include improvements in production and manufacturing, efficiency in packaging, and a tailored approach to interfaces of a battery module based on the requirements at each particular interface.

Figure 1:
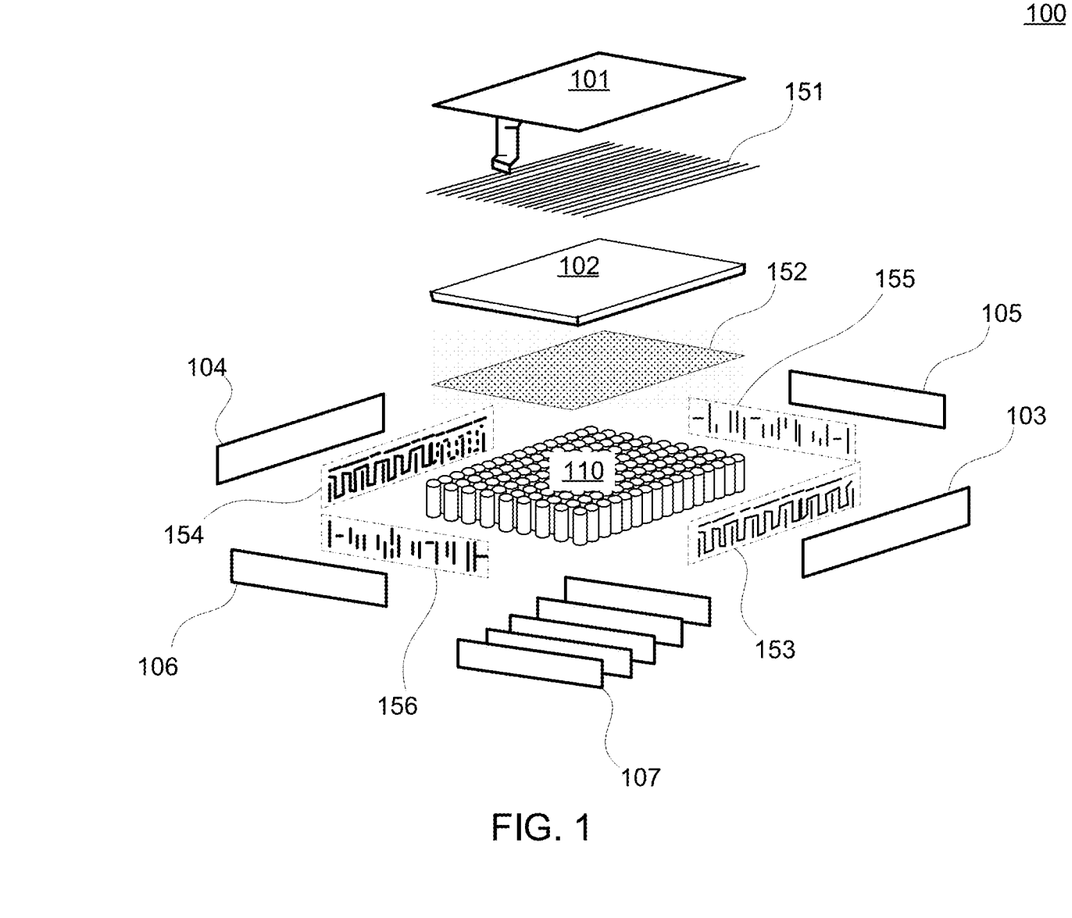
FIG. 1 shows an exploded view of an illustrative battery pack, including adhesive joints, in accordance with some embodiments of the present disclosure.

FIG. 1 shows an exploded view of illustrative battery module 100, including adhesive joints, in accordance with some embodiments of the present disclosure. Battery module 100 includes plurality of battery cells 110, carrier 102, layer 101, dividers 107, and side wall sections 103-106, affixed together using adhesives 151-156. As used herein, the term "side wall" refers to the collection of lateral surfaces arranged around a plurality of battery cells, and may include a single section or more than one section (e.g., a plurality of sections such as four sections, as illustrated), arranged adjacent to each other or with gaps in between one or more neighboring sections. To illustrate, side wall sections 103-106 may be joined as, or otherwise parts of, a single component (e.g., bent sheet metal), optionally with an open seam to allow ease of installation. As illustrated, adhesive 152 bonds plurality of battery cells 110 to carrier 102; adhesive 151 bonds carrier 102 to layer 101; adhesive 153 bonds side wall section 103 to a first side of plurality of battery cells 110; adhesive 154 bonds side wall section 104 to a second side of plurality of battery cells 110; adhesive 155 bonds side wall section 105 to a third side of plurality of battery cells 110; adhesive 156 bonds side wall section 106 to a fourth side of plurality of battery cells 110; and dividers 107 are arranged among plurality of battery cells 110 (e.g., between adjacent groups of battery cells that are electrically connected in series) and bonded to carrier 102 by adhesive 152. The sides of plurality of battery cells 110 include a collection of cylindrical interfaces to which side wall sections 103-106 may be bonded. For example, each of side wall sections 103-106 may contact only a portion of battery cells arranged on the respective side (e.g., an outermost portion). In a further example, side wall sections 103-106 may be flat, curved, segmented, compound-shaped, scalloped (e.g., to accommodate and more fully follow the curved battery cells), have any other suitable profile or shape, or any combination thereof.

In some embodiments, carrier 102 includes a plurality of recesses. For example, carrier 102 may include an array of holes configured to accommodate respective battery cells of plurality of battery cells 110. To illustrate, each battery cell of plurality of battery cells 110 may be positioned in a respective recess of carrier 102, which arranges plurality of battery cells 110 laterally. The arrangement may include a close packing (e.g., hexagonal close packing having any suitable spacing), an array (e.g. a rectangular array), or any other suitable arrangement. In some embodiments, each battery cell of plurality of battery cells 110 may be pressed axially such that ends of the plurality of battery cells distal to carrier 102 substantially lie in a plane parallel to carrier 102 (e.g., thus laterally and axially aligned). Accordingly, adhesive 152 may be a continuous layer, a layer having holes or openings, an arrangements of suitable drops or dollops that correspond with the arrangement of plurality of battery cells 110, a path that extends to interface with each battery cell of plurality of battery cells 110 (e.g., in a serpentine path), any other suitable application type, or any combination thereof.

Layer 101 may include one or more current collectors configured to be electrically coupled to plurality of battery cells 110, or a subset thereof. For example, layer 101 may include a current collector assembly including a plurality of current collectors (e.g., which may include comb-like structures that spread over the battery cells in the plane of layer 101). Each current collector may be coupled to a subset of plurality of battery cells 110 to form electrical buses. The electrical coupling may be achieved by wire bonding, welding (e.g., ultrasonic welding, laser welding), pressing or spring force, or a combination thereof. To illustrate, carrier 102 may be dielectric or otherwise non-conducting electronically, thus providing insulation between layer 101 and plurality of battery cells 110. Accordingly, a plurality of leads may be affixed to the current collector(s) and plurality of battery cells 110 to create electrically conductive paths among plurality of battery cells. 110. The current collectors may electrically couple subsets of battery cells in parallel, with the subsets being electrically coupled in series.

In some embodiments, adhesives 152, 155, and 156 include the same type of adhesive. In some embodiments, adhesives 153 and 154 each include the same one or more adhesives. For example, adhesives 153-156 may each include two adhesives to form a pattern (e.g., a fast-cure and a slow-cure adhesive). In some embodiments, adhesive 151 has a relatively high dielectric strength to prevent electrical shorting from plurality of battery cells 110 to layer 101 (e.g., layer 101 may include one or more current collectors and insulators). For example, in some embodiments, adhesive 151 may be the same as at least one component or portion of adhesives 153 and 154.

Figure 2:
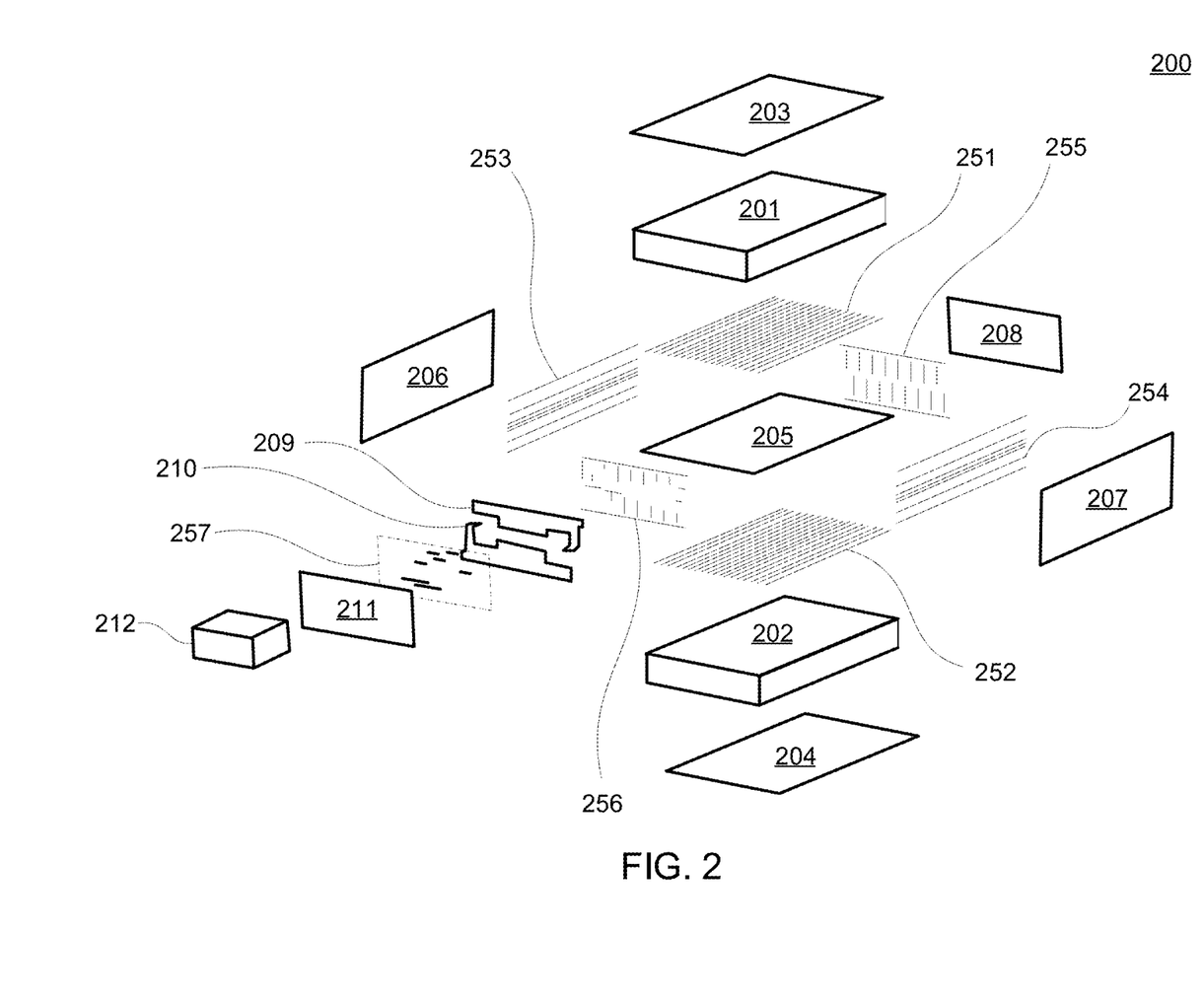
FIG. 2 shows an exploded view of an illustrative battery module, including two battery packs (e.g., submodules) and adhesive joints, in accordance with some embodiments of the present disclosure.

FIG. 2 shows an exploded view of illustrative battery module 200, including two battery submodules and adhesive joints, in accordance with some embodiments of the present disclosure. Each of battery submodules 201 and 202 may be, but need not be, the same as battery module 100 of FIG. 1. Battery module 200 includes battery submodules 201 and 202, covers 203 and 204, cooling plate 205, shear walls 206 and 207, busbar 208, terminal busbars 209 and 210, isolation bracket 211, and control circuitry 212, affixed together using adhesives 251-257. As illustrated, adhesive 251 bonds battery submodule 201 to cooling plate 205; adhesive 252 bonds battery submodule 202 to cooling plate 205; adhesive 253 bonds shear wall 206 to battery submodules 201 and 202; adhesive 254 bonds shear wall 207 to battery submodules 201 and 202; adhesive 255 bonds busbar 208 to battery submodules 201 and 202; adhesive 256 bonds terminal busbars 209 and 210 to battery submodules 201 and 202, respectively; and adhesive 257 bonds isolation bracket 211 to terminal busbars 209 and 210.

In some embodiments, adhesives 253, 254, 255, 256, and 257 include the same type of adhesive or adhesives. For example, adhesives 253-257 may exhibit relatively high shear strength. In some embodiments, adhesives 251 and 252, which may include the same type of adhesive, have a relatively high thermal conductivity to allow heat transfer from battery packs 201 and 202 to cooling plate 205.

Figure 3:
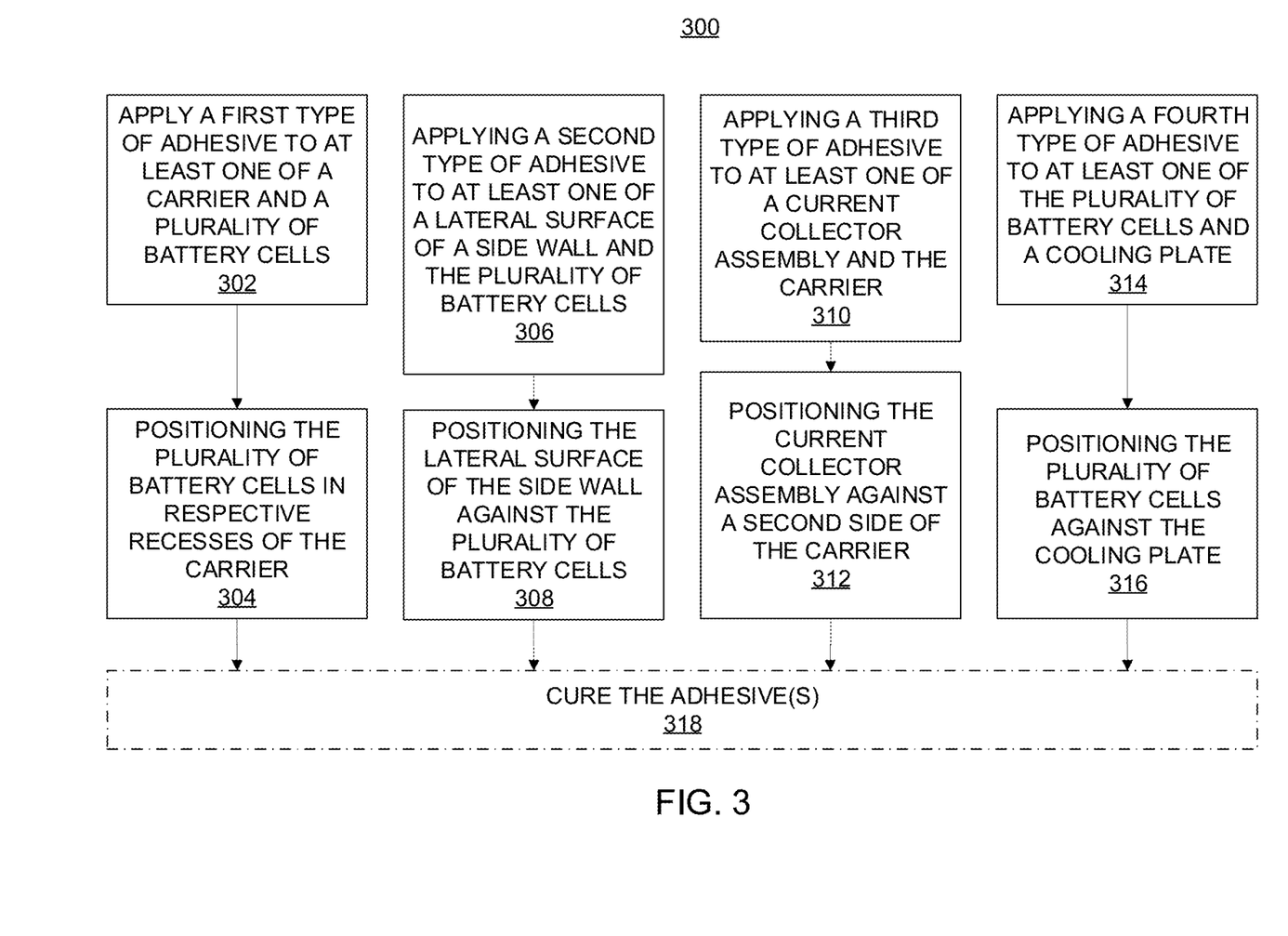
FIG. 3 shows a flowchart of an illustrative process for assembling a battery system using adhesives, without fasteners, in accordance with some embodiments of the present disclosure.

FIG. 3 shows a flowchart of illustrative process 300 for assembling a battery system using adhesives, without fasteners, in accordance with some embodiments of the present disclosure. Process 300 may be applied to, for example, assemble a battery system for an electrical vehicle that is relatively more lightweight and compact as compared to systems assembled using fasteners. Further, in some embodiments, one or more fasteners may be included to provide redundancy to adhesive bonding.

Step 302 includes applying a first type of adhesive to at least one of a carrier and a plurality of battery cells. In some embodiments, the carrier includes a plurality of recesses on a first side of the carrier configured to receive the plurality of battery cells. The first type of adhesive may include any suitable properties. For example, the first type of adhesive (e.g., a UV-cure structural adhesive) may include a cure time of less than 60 seconds (e.g., through clear polycarbonate), a lap shear strength in excess of 15 MPa at 25 C, a thermal conductivity of 0.3 W/mK, and a dielectric breakdown strength in excess of 19.0 kV/mm. In an illustrative example, the first type of adhesive may be used as adhesive 152 of FIG. 1, which bonds plurality of battery cells 110 to carrier 102.

Step 304 includes positioning the plurality of battery cells in respective recesses of the carrier. The first type of adhesive of step 302 bonds the plurality of battery cells to the carrier. In some embodiments, step 304 includes arranging the plurality of battery cells laterally (e.g., in respective recesses of the carrier), and pressing the plurality of battery cells axially such that ends of the plurality of battery cells distal to the carrier substantially lie in a plane parallel to the carrier.

Step 306 includes applying a second type of adhesive to a lateral surface of a side wall, a side of the plurality of battery cells, or both. The second type of adhesive may include any suitable properties. For example, the second type of adhesive (e.g., a UV-cure structural adhesive used in tandem with an ambient-temperature curing 2K structural adhesive) may include an average joint lap shear strength between 18 and 22 MPa, a dielectric breakdown strength in excess of 15.0 kV/mm, and a fixture strength cure time within 40 minutes at ambient temperature. The second type of adhesive is dielectric to prevent shorting among the plurality of battery cells. In some embodiments, the second adhesive is configured for transferring heat and shear stress between the plurality of battery cells and the side wall. In some embodiments, the second type of adhesive may include a combination of adhesives having different curing properties. In an illustrative example, the second type of adhesive may be one of adhesives 153-156 of FIG. 1, which bond one of sidewalls 103-106 to a side of plurality of battery cells 110. In a further example, adhesives 153 and 154 may each include more than one type of adhesive. In some embodiments, the second type of adhesive is the same as the first type of adhesive of step 302. In some embodiments, the second type of adhesive includes a fast-cure adhesive and a slow-cure adhesive, and the first type of adhesive of step 302 and the slow-cure adhesive are the same type of adhesive.

Step 308 includes positioning the lateral surface of the side wall against the side of the plurality of battery cells in order for the second type of adhesive of step 306 to bond the side wall to the side of the plurality of battery cells. It will be understood that positioning the lateral surface of the side wall against the side of the plurality of battery cells includes positioning the side wall adjacent to and spaced apart from the side of the battery cells with the second type of adhesive therebetween. In some embodiments, steps 306 and 308 may be repeated for each side of the plurality of battery cells.

Step 310 includes applying a third type of adhesive to at least one of a current collector assembly and the carrier. The current collector assembly may include, for example, one or more busbars configured to electrically couple battery cells in parallel, series, or a combination thereof. The third type of adhesive may include any suitable properties. For example, the third type of adhesive (e.g., an ambient-temperature curing 2K structural adhesive) may include a bulk lap shear strength in excess of 18 MPa, a dielectric breakdown strength in excess of 15.0 kV/mm, and a fixture strength cure time within 40 minutes at ambient temperature (e.g. with or without embedded glass beads for bondline setting). The third type of adhesive is dielectric to prevent shorting among the plurality of battery cells and the current collector, busbars of the current collector, or both. In an illustrative example, the third type of adhesive may be used as adhesive 151 of FIG. 1, which bonds carrier 102 to layer 101 (e.g., a current collector assembly).

Step 312 includes positioning the current collector assembly against a second side of the carrier. It will be understood that positioning the current collector assembly against the side of the plurality of battery cells includes positioning the current collector assembly adjacent to and spaced apart from the second side of the carrier with the third type of adhesive therebetween. In some embodiments, step 312 or a subsequent step includes electrically coupling the current collector assembly to the plurality of battery cells to form one or more buses.

Step 314 includes applying a fourth type of adhesive to at least one of the plurality of battery cells and a cooling plate. The fourth type of adhesive may include any suitable properties. For example, the fourth type of adhesive (e.g., an ambient-temperature curing 2K structural adhesive with thermal filler) may include a bulk lap shear strength of 14 MPa or higher, tensile modulus in excess of 1.5 GPa, thermal conductivity between 1.0 and 1.2 W/mK, dielectric breakdown strength in excess of 19 kV/mm, and a fixture strength cure time within 30 minutes at ambient temperature (e.g., with or without embedded glass beads for bondline setting). The fourth type of adhesive is dielectric to prevent shorting among the plurality of battery cells and the cooling plate. Further, the fourth type of adhesive provides for heat transfer, shear stress transfer, or both between the plurality of battery cells and the cooling plate. In an illustrative example, the fourth type of adhesive may be used as adhesive 251 or 252 of FIG. 2, which bond battery submodule 201 or 202 to cooling plate 205. In some embodiments, applying the first type of adhesive at step 302 occurs before applying the fourth type of adhesive at step 314.

Step 316 includes positioning the plurality of battery cells against the cooling plate. For example, the plurality of battery cells may be pressed against the cooling plate while the fourth type of adhesive cures. It will be understood that positioning the plurality of battery cells against the cooling plate includes positioning the plurality of battery cells adjacent to and spaced apart from the cooling plate with the third type of adhesive therebetween.

Process 300 may include positioning and bonding any suitable components in a battery assembly using adhesives. For example, in some embodiments, process 300 includes applying another type of adhesive to at least one of a shear wall and the side wall, and positioning the shear wall against the side wall (e.g., the other type of adhesive bonds the shear wall to the side wall to provide structural support to the plurality of battery cells). In a further example, in some embodiments, process 300 includes applying another adhesive to bond at least one terminal busbar to the side wall, and positioning the at least one terminal busbar against the side wall (e.g., the at least one terminal busbar is configured to be electrically coupled to the plurality of battery cells). In a further example, in some embodiments, process 300 includes applying another adhesive to bond at least one terminal busbar to the cold plate (e.g., at least one terminal busbar is configured to be thermally coupled to the cold plate). In a further example, in some embodiments, process 300 includes applying a fifth adhesive to bond a busbar to the side wall, and positioning the busbar against the side wall (e.g., the busbar is configured to be electrically coupled to the current collector assembly).

Step 318 includes curing one or more of the adhesives of steps 302, 306, 310, and 314. For example, curing may include applying heat, applying UV light, applying a chemical agent to cause curing (e.g., a primer), allowing at least a predetermined period of time to pass until stress is applied to the adhered joint, applying any other suitable curing, or any combination thereof. It will be understood that step 318 may be performed multiple times. For example, step 318 may be performed after steps 302 and 304, after steps 306 and 308, after steps 310 and 312, and after steps 314 and 316.

In some embodiments, the steps of FIG. 3 are repeated for a second submodule, which is positioned on a second side of the cooling plate to form, for example, battery module 200 of FIG. 2.

Figure 4:
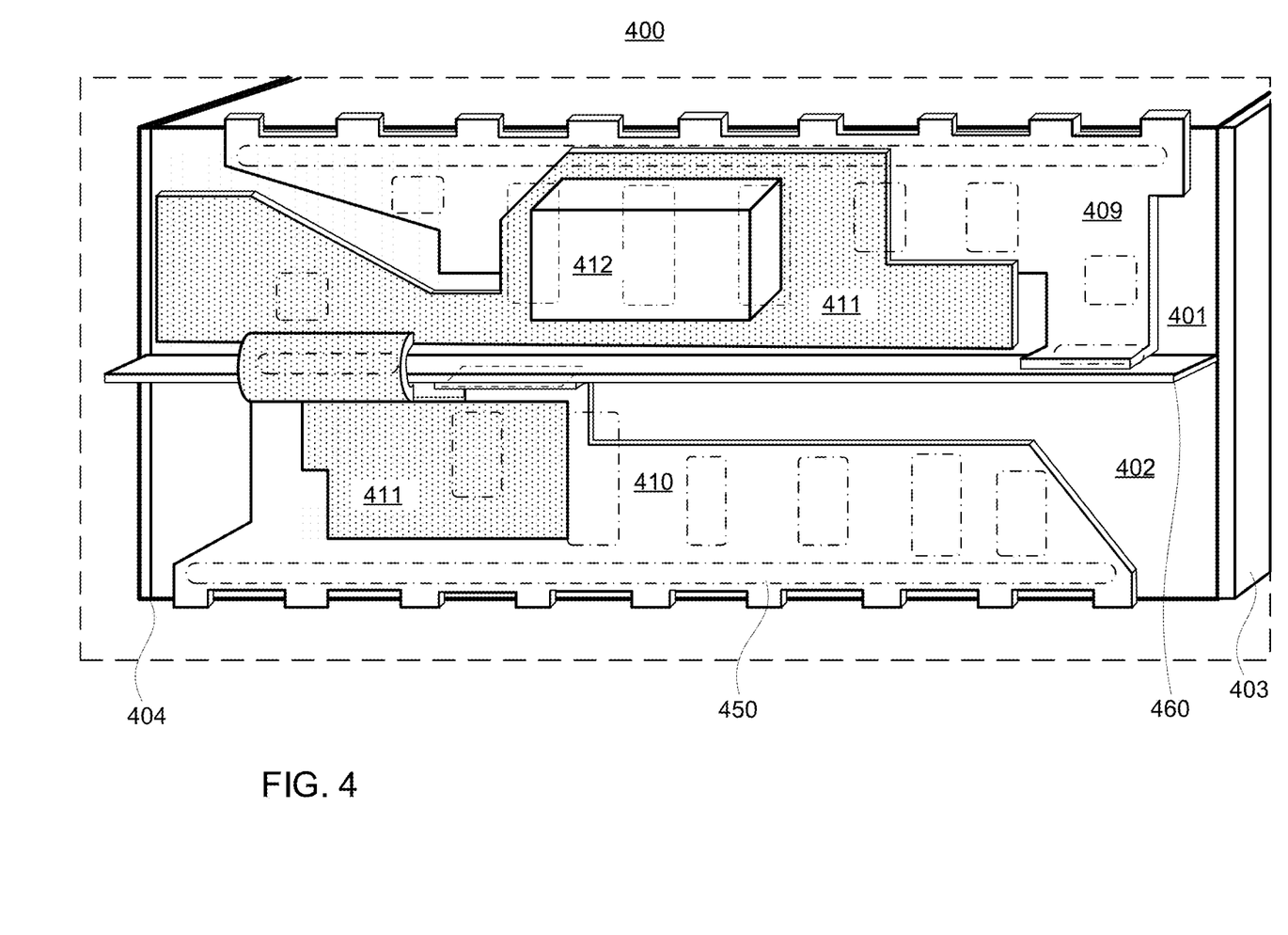
FIG. 4 shows a perspective view of an illustrative battery module with busbars, brackets, and control circuitry, in accordance with some embodiments of the present disclosure.

FIG. 4 shows a perspective view of illustrative battery module 400 with busbars 409 and 410, bracket 411, and control circuitry 412, in accordance with some embodiments of the present disclosure. Busbars 409 and 410, bracket 411, and control circuitry 412 are affixed using adhesive 450, which is indicated by dot-dashed lines in FIG. 4 (e.g., the areas adhesive is applied and binds components together). As illustrated, battery module 400 includes battery submodules 401 and 402 (e.g., which may be similar to battery submodules 201 and 202 of FIG. 2), sidewalls 403 and 404, and cooling plate 460 to which battery cells of battery submodules 401 and 402 are adhered. Busbars 409 and 410 are affixed to respective battery submodules 401 and 402 using adhesive, indicated by the dot-dashed lines. As illustrated, bracket 411 is affixed to both of busbars 409 and 410 using adhesive, and control circuitry 412 is affixed to bracket 411 using adhesive. Busbars 409 and 410 are each affixed to cooling plate 460 using adhesive (e.g., to improve stiffness, to provide a thermally conductive path for heat transfer to cooling plate 460, or both).

Figure 5:
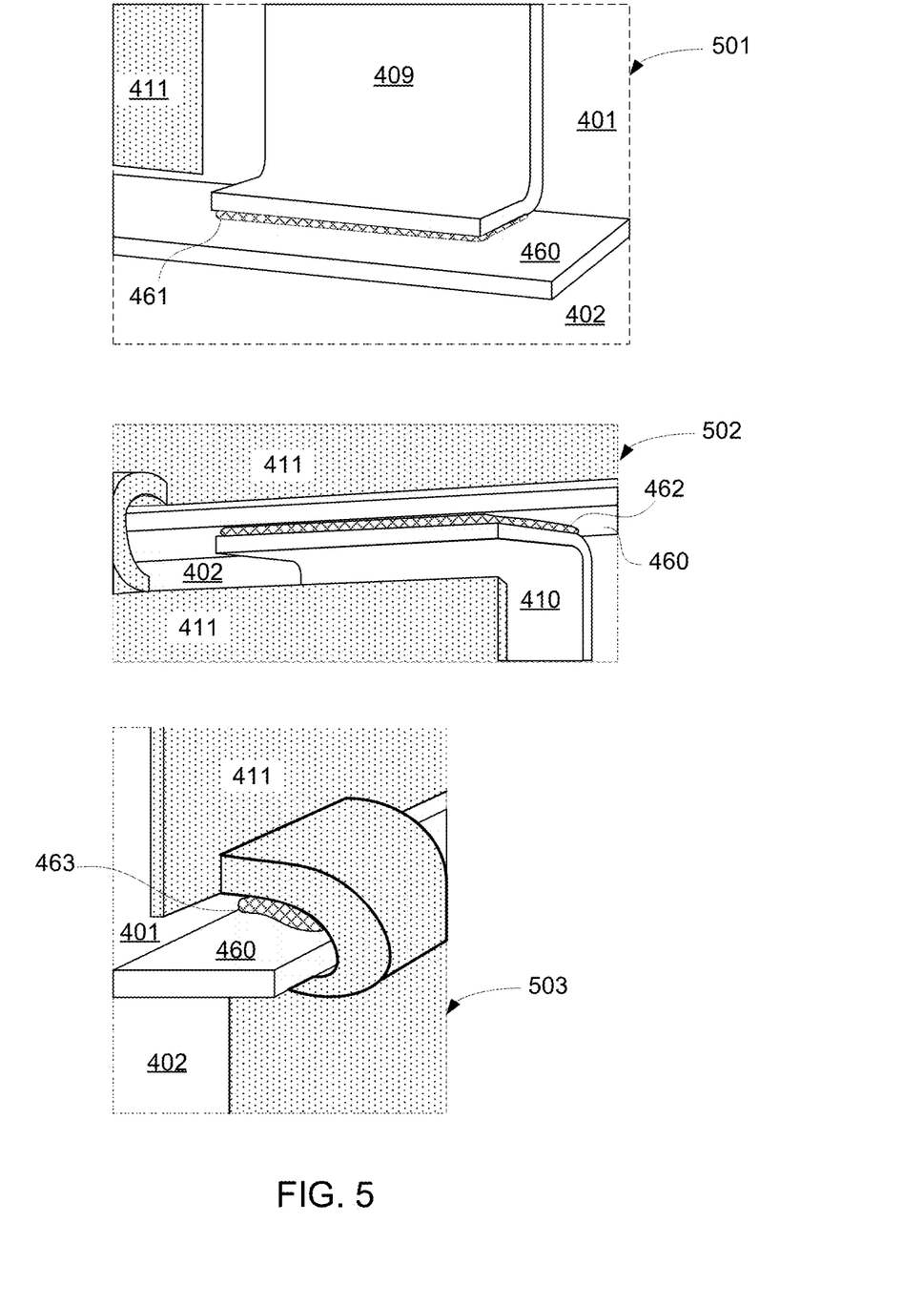
FIG. 5 shows perspective views of aspects of the illustrative battery module of FIG. 4, in accordance with some embodiments of the present disclosure.

FIG. 5 shows perspective views of aspects of the illustrative battery module of FIG. 4, in accordance with some embodiments of the present disclosure.

Panel 501 shows an expanded view of the interface between busbar 409 and cooling plate 460. Adhesive 461 bonds busbar 409 to cooling plate 460, thus providing structural support, a path for heat transfer, or both. For example, adhesive 461 may be thermally conductive to help transfer hear from busbar 409 to cooling plate 460. In a further example, adhesive 461 may be dielectric to prevent shorting between busbar 409 and cooling plate 460 (e.g., or a sheet of insulation or other dielectric material may be included along with adhesive 461 to prevent electrical shorting).

Panel 502 shows an expanded view of the interface between busbar 410 and cooling plate 460. Adhesive 462 bonds busbar 410 to cooling plate 460, thus providing structural support, a path for heat transfer, or both. For example, adhesive 462 may be thermally conductive to help transfer hear from busbar 410 to cooling plate 460. In a further example, adhesive 462 may be dielectric to prevent shorting between busbar 410 and cooling plate 460 (e.g., or a sheet of insulation or other dielectric material may be included along with adhesive 462 to prevent electrical shorting).

Panel 503 shows an expanded view of the interface between bracket 411 and cooling plate 460. Adhesive 463 bonds bracket 411 to cooling plate 460, thus providing structural support, a path for heat transfer, or both. For example, adhesive 463 may be thermally conductive to help transfer hear from bracket 411 to cooling plate 460. In a further example, adhesive 463 may be dielectric to prevent shorting between bracket 411 and cooling plate 460 (e.g., or a sheet of insulation or other dielectric material may be included along with adhesive 463 to prevent electrical shorting).

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. An apparatus comprising:
   a first type of adhesive bonding a first side of a carrier to a plurality of battery cells, wherein the carrier is configured to maintain alignment of the plurality of battery cells;
   a second type of adhesive bonding a side wall to the plurality of battery cells;
   a third type of adhesive bonding a current collector to a second side of the carrier, wherein the current collector is configured to be electrically coupled to the plurality of battery cell; and
   a fourth type of adhesive bonding the plurality of battery cells to the cooling plate, wherein the first, second, third, and fourth types of adhesives form a fastener-free assembly.

2. The apparatus of claim 1, wherein the first type of adhesive further bonds a plurality of dividers to the carrier to maintain separation of the plurality of battery cells.

3. The apparatus of claim 1, wherein the side wall comprises:
   at least one short side bonded to the plurality of battery cells using the second type of adhesive; and
   at least one long side bonded to the plurality of battery cells using the second type of adhesive and the third type of adhesive.

4. The apparatus of claim 1, wherein the first type of adhesive and the second type of adhesive are the same type of adhesive.

5. The apparatus of claim 1, wherein the second type of adhesive comprises a fast-cure adhesive and a slow-cure adhesive that cures slower than the fast-cure adhesive, and wherein the first type of adhesive comprises the slow-cure adhesive.

6. A method for assembling a battery system without fasteners, the method comprising:
   applying a first type of adhesive to at least one of a carrier and a plurality of battery cells, wherein the carrier comprises a plurality of recesses configured to receive the plurality of battery cells on a first side of the carrier;
   positioning the plurality of battery cells in respective recesses of the carrier, wherein the first type of adhesive bonds the plurality of battery cells to the carrier;
   applying a second type of adhesive to at least one of a lateral surface of a side wall and a side of the plurality of battery cells;
   positioning the lateral surface of the side wall against the plurality of battery cells, wherein the second type of adhesive bonds the side wall to the side of the plurality of battery cells;
   applying a third type of adhesive to at least one of a current collector assembly and the carrier;
   positioning the current collector assembly against a second side of the carrier, wherein the third type of adhesive bonds the current collector assembly to the carrier;
   applying a fourth type of adhesive to at least one of the plurality of battery cells and a cooling plate; and
   positioning the plurality of battery cells against the cooling plate, wherein the fourth type of adhesive bonds the plurality of battery cells to the cooling plate, wherein the first, second, third, and fourth types of adhesives form a fastener-free assembly.

7. The method of claim 6, wherein the first type of adhesive and the second type of adhesive are the same type of adhesive.

8. The method of claim 6, wherein the second type of adhesive comprises a fast-cure adhesive and a slow-cure adhesive, and wherein the first type of adhesive and the slow-cure adhesive are the same type of adhesive.

9. The method of claim 6, further comprising:
   applying a fifth type of adhesive to at least one of a shear wall and the side wall; and
   positioning the shear wall against the side wall, wherein the fifth type of adhesive bonds the shear wall to the side wall to provide structural support to the plurality of battery cells.

10. The method of claim 6, further comprising:
    applying a fifth type of adhesive to bond at least one terminal busbar to the side wall; and
    positioning the at least one terminal busbar against the side wall, wherein the at least one terminal busbar is configured to be electrically coupled to the at least one terminal busbar to the plurality of battery cells.

11. The method of claim 6, further comprising:
    applying a fifth type of adhesive to bond at least one terminal busbar to the cooling plate; and
    positioning the at least one terminal busbar against the cooling plate, wherein the at least one terminal busbar is configured to be electrically coupled to the at least one terminal busbar to the plurality of battery cells.

12. The method of claim 6, further comprising:
    applying a fifth type of adhesive to bond a busbar to the side wall; and
    positioning the busbar against the side wall, wherein the busbar is configured to be electrically coupled to the current collector assembly.

13. The method of claim 6, wherein applying the first type of adhesive occurs before applying the fourth type of adhesive.

14. The method of claim 6, wherein positioning the plurality of battery cells in respective recesses of the carrier comprises:
    arranging the plurality of battery cells laterally; and
    pressing the plurality of battery cells axially such that ends of the plurality of battery cells distal to the carrier substantially lie in a plane parallel to the carrier.

15. The method of claim 6, wherein the fourth type of adhesive is configured for transferring heat and shear stress between the plurality of battery cells and the cooling plate.

16. The method of claim 6, wherein the first type of adhesive is configured for maintaining electrical isolation between the carrier and the plurality of battery cells.

17. The method of claim 6, wherein the second adhesive is configured for transferring heat and shear stress between the plurality of battery cells and the side wall.

18. The apparatus of claim 1, wherein the first, second, third, and fourth types of adhesives structurally bond the plurality of battery cells, the carrier, the current collector, the side wall, and the cooling plate together to form an adhered assembly.

19. The apparatus of claim 18, further comprising at least one fastener to provide redundancy to the first, second, third, or fourth type of adhesive.

20. An apparatus comprising:
- a first type of adhesive bonding a first side of a carrier to a plurality of battery cells;
- a second type of adhesive bonding a side wall to the plurality of battery cells;
- a third type of adhesive bonding a current collector to a second side of the carrier, wherein the current collector is configured to be electrically coupled to the plurality of battery cells; and
- a fourth type of adhesive bonding the plurality of battery cells to a cooling plate without fasteners, wherein the first, second, third, and fourth types of adhesives form a fastener-free assembly.

\* \* \* \* \*